United States Patent [19]
Christian

[11] Patent Number: 5,596,363
[45] Date of Patent: Jan. 21, 1997

[54] APPARATUS FOR STEREOSCOPICALLY VIEWING SCREENED IMAGES

[76] Inventor: John A. Christian, 5 Towers Way, Corfo Mullen, Wimborne, Dorset, United Kingdom, BH21 3UA

[21] Appl. No.: 302,838
[22] PCT Filed: Aug. 4, 1993
[86] PCT No.: PCT/GB93/01642
 § 371 Date: Jan. 20, 1995
 § 102(e) Date: Jan. 20, 1995
[87] PCT Pub. No.: WO94/04002
 PCT Pub. Date: Feb. 17, 1994

[30] Foreign Application Priority Data

Aug. 4, 1992 [GB] United Kingdom .................. 9216556

[51] Int. Cl.⁶ .............................. H04N 13/04; H04N 7/18
[52] U.S. Cl. ............................................................. 348/58
[58] Field of Search .................................. 348/58, 57, 60, 348/55, 54, 53, 51, 47, 44, 42, 59, 56

[56] References Cited

U.S. PATENT DOCUMENTS

| 4,523,226 | 6/1985 | Lipton et al. | 348/49 |
| 4,559,556 | 12/1985 | Wilkins | 348/58 |
| 4,588,259 | 5/1986 | Sheiman | 348/51 |
| 4,740,836 | 4/1988 | Craig | 348/49 |
| 4,967,267 | 10/1990 | Gallaher, Jr. | 348/49 |
| 5,124,840 | 6/1992 | Trumbull et al. | 348/54 |
| 5,193,000 | 3/1993 | Lipton et al. | 348/43 |
| 5,270,751 | 12/1993 | Christian | 353/7 |
| 5,281,957 | 1/1994 | Schoolman | 348/53 |

FOREIGN PATENT DOCUMENTS

| 2621205 | 3/1989 | France | H04N 13/04 |
| 2210992 | 6/1989 | United Kingdom | G02B 27/26 |

Primary Examiner—Tommy P. Chin
Assistant Examiner—Bryan S. Tung
Attorney, Agent, or Firm—Iandiorio & Teska

[57] ABSTRACT

Apparatus (2) for stereoscopically viewing images from a single screen, comprising a housing (6), at least one mirror (8,10) which just reflects light, a mirror (12) which both reflects light and transmits light, and a polarizing device (14, 16). The mirrors (8, 10, 12) are mounted at an angle and are optically in communication with each other whereby a pair of landscape stereoscopic images are optically manipulated between an orientation required suitable for visual image recording or reproduction.

7 Claims, 9 Drawing Sheets

APPARATUS FOR STEREOSCOPICALLY VIEWING SCREENED IMAGES

This invention relates to apparatus for stereoscopically viewing screened images.

Stereoscopic viewing generally requires a pair of landscape format images to be orientated horizontally end to end in order to enable human eyes to see them side by side. Such an orientation is not necessary for photographic/television recording and reproduction, where the pair of landscape format images may have their longest sides adjoining and may be up ended by rotation through 90°. As will be understood by those skilled in the art, a landscape format image is an image which is wider than it is high, the ratio of side lengths being 4:3 for current televisions. A portrait format image means an image which is higher than it is wide, such portrait format images being generally not accepted as a convenient shape for general photographic purposes.

According to the present invention, there is provided apparatus for stereoscopically viewing screened images, which apparatus comprises a housing, and optical means for the optical manipulation of a pair of landscape stereoscopic images between an orientation required for human viewing and an alternative orientation suitable for visual image recording or reproduction.

The screened pictures may be pictures on television screens, computer screens, projection screens, liquid crystal display screens, and any other suitable and appropriate viewing screens.

The optical means may be at least one mirror which just reflects light and a mirror which both reflects and transmits light. The mirror which both reflects and transmits light is preferably a half silvered mirror which reflects substantially 50% of the light and which transmits substantially 50% of the light.

The optical means may include polarizing filters and/or polarising spectacles.

In a first embodiment of the invention, the apparatus may be one which includes a television having a base, a top and sides, and in which the television is positioned on one of its sides, in which the mirror which both reflects and transmits light is positioned between upper and lower mirrors which just reflect light, in which a television screen of the television is positioned adjacent the lower mirror and the mirror which both reflects and transmits light, in which a first polarizing filter is positioned between the television screen and the lower mirror, and in which a second and oppositely polarizing filter is positioned between the television screen and the mirror which both reflects and transmits light.

In the first embodiment of the invention, the lower mirror is advantageously a hinged mirror which is hinged about an upper edge. Adjustment of the hinged mirror provides vertical alignment of the two images for a given size of television screen and viewing position. Horizontal adjustment and rotational adjustment are not necessary.

In a second embodiment of the invention, the apparatus is one which includes a television having a base, a top and sides, and in which the television is positioned on its base, in which the mirror which both reflects and transmits light is positioned above a lower mirror which just reflects light and is also positioned between the lower mirror which just reflects light and another mirror which just reflects light and which is horizontally in line with the mirror which both reflects and transmits light, in which a television screen of the television is positioned adjacent the lower mirror, in which optical barrier means separates the lower mirror into first and second parts, in which a first polarizing filter is positioned between the television screen and the first part of the lower mirror, and in which a second and oppositely polarizing filter is positioned between the television screen and the second part of the lower mirror.

In the second embodiment of the invention, the said other mirror is preferably hinged about an upper edge, in order to provide vertical adjustment of the two images for a given size of television screen and viewing position. As in the first embodiment of the invention, horizontal adjustment and rotational adjustment are not necessary.

Embodiments of the invention will now be described solely by way of example and with reference to the accompanying drawings in which.

Figure 1:
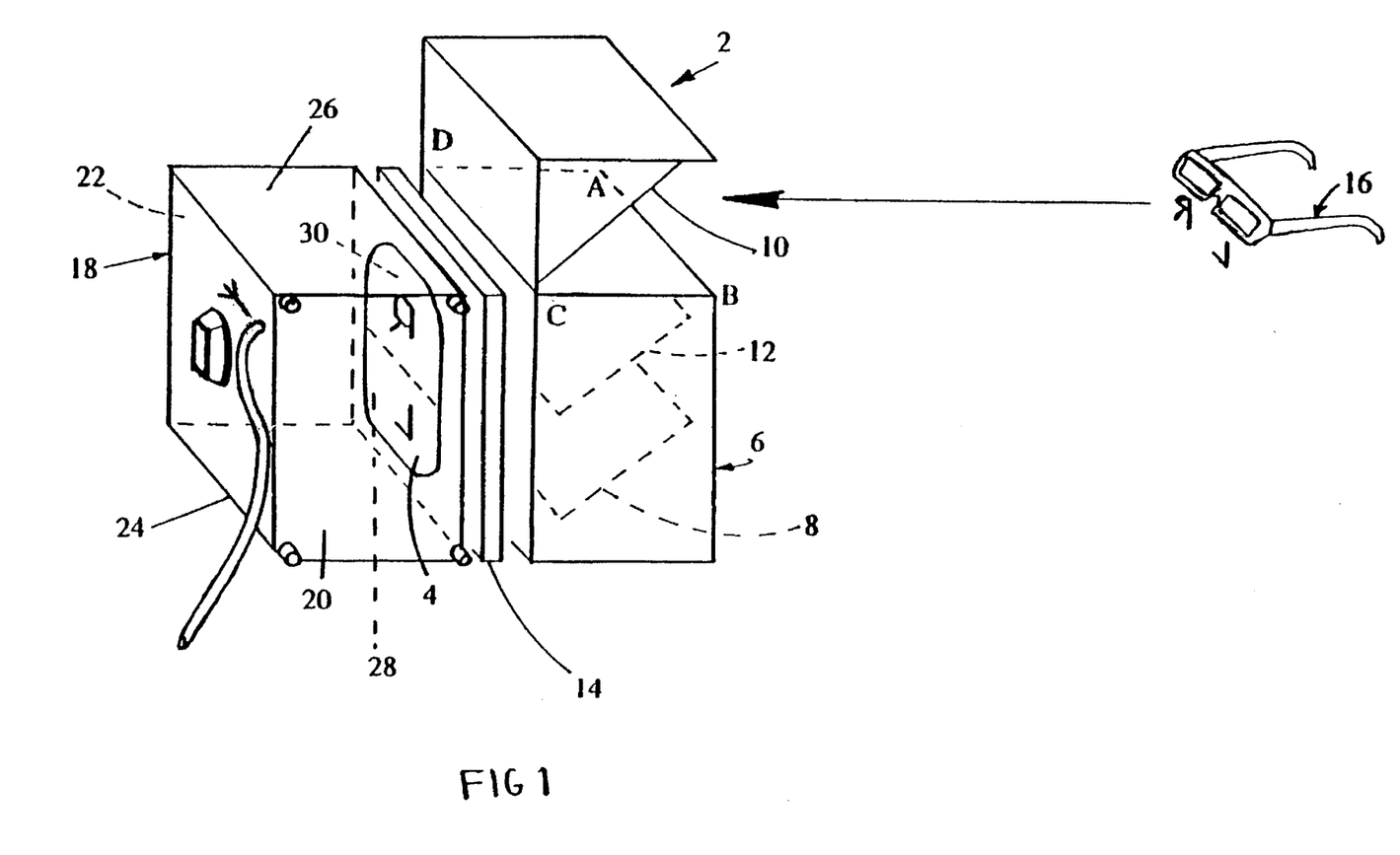
FIG. 1 shows first apparatus for stereoscopically viewing television pictures.

Referring to FIG. 1, there is shown apparatus 2 for stereoscopically viewing a television screen 4. The apparatus 2 comprises a housing 6 which as shown in FIG. 2 has been separated for ease of understanding.

The apparatus 2 further comprises optical means for the optical manipulation of a pair of landscape stereoscopic images between an orientation or orientations required for human viewing and an alternative orientation suitable for photographic/television recording or reproduction. More specifically, the optical means is a combination of two mirrors 8, 10 which just reflect light, and a mirror 12 which both reflects and transmits light. The mirror 12 is a half silvered mirror which reflects substantially 50% of the light and which transmits substantially 50% of the light. The optical means also includes polarizing filters in a polarizing frame 14, and polarizing spectacles 16.

As can be seen from FIG. 1, the television screen 4 is in a television 18 having a base 20, a top 22 and sides 24, 26. The television 18 is shown positioned on its side 24, that is, with the television screen 4 facing an audience. The television 18 has been rotated clockwise through 90° such that the television 18 stands on its conventional right hand side.

Figure 2:
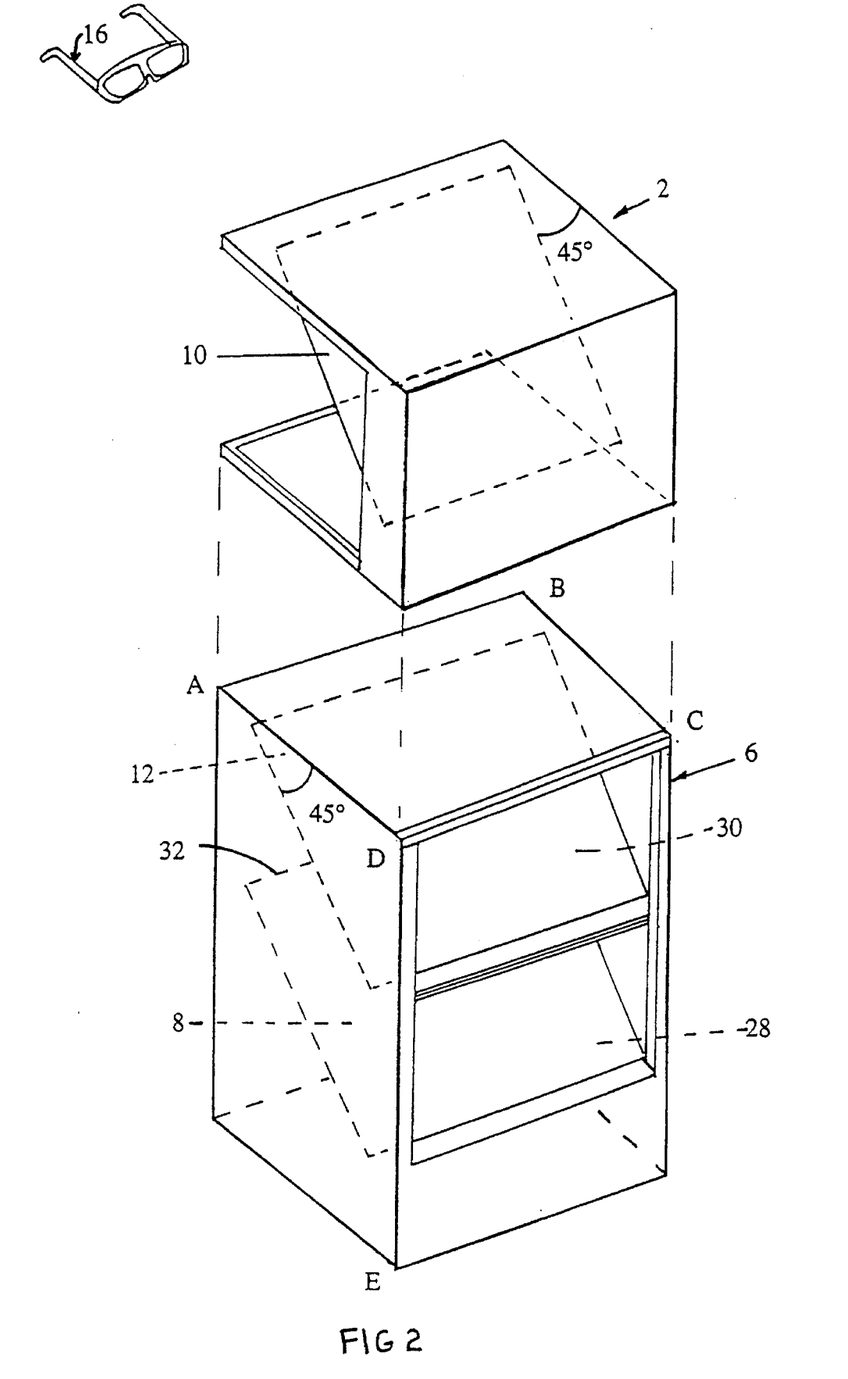
FIG. 2 is an enlarged view of part of the apparatus shown in FIG. 1, and viewed from a different angle.

In the apparatus 2 as shown in FIGS. 1 and 2, the mirror 12 is positioned between the mirror 8 which forms a lower mirror and the mirror 10 which forms an upper mirror. A first polarizing filter 28 is positioned in the polarizing frame 14 such that it is between the television screen 4 and the lower mirror 8. A second and oppositely polarizing filter 30 is positioned in the polarizing frame 14 such that it is between the television screen 4 and the mirror 12.

The mirror 8 is hinged about an upper edge 32. The mirror 12 makes an angle of 45° as shown. Left and right eye images are shown b, the letters L and R on the television screen 4 and on the lenses of the polarizing spectacles 16.

Figure 3:
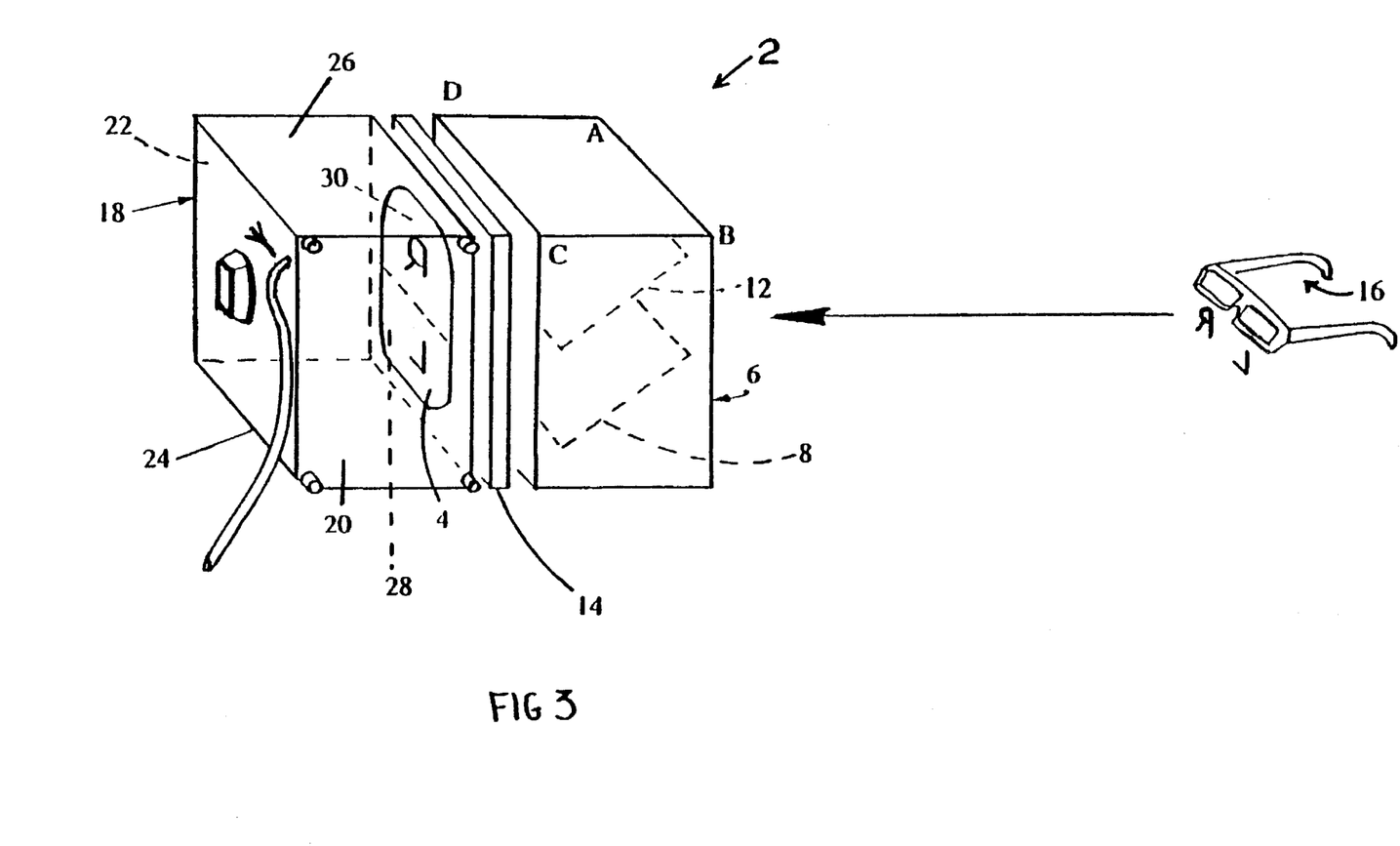
FIG. 3 shows second apparatus which is for stereoscopically viewing television pictures, and which is like the first apparatus shown in FIG. 1.
Figure 4:
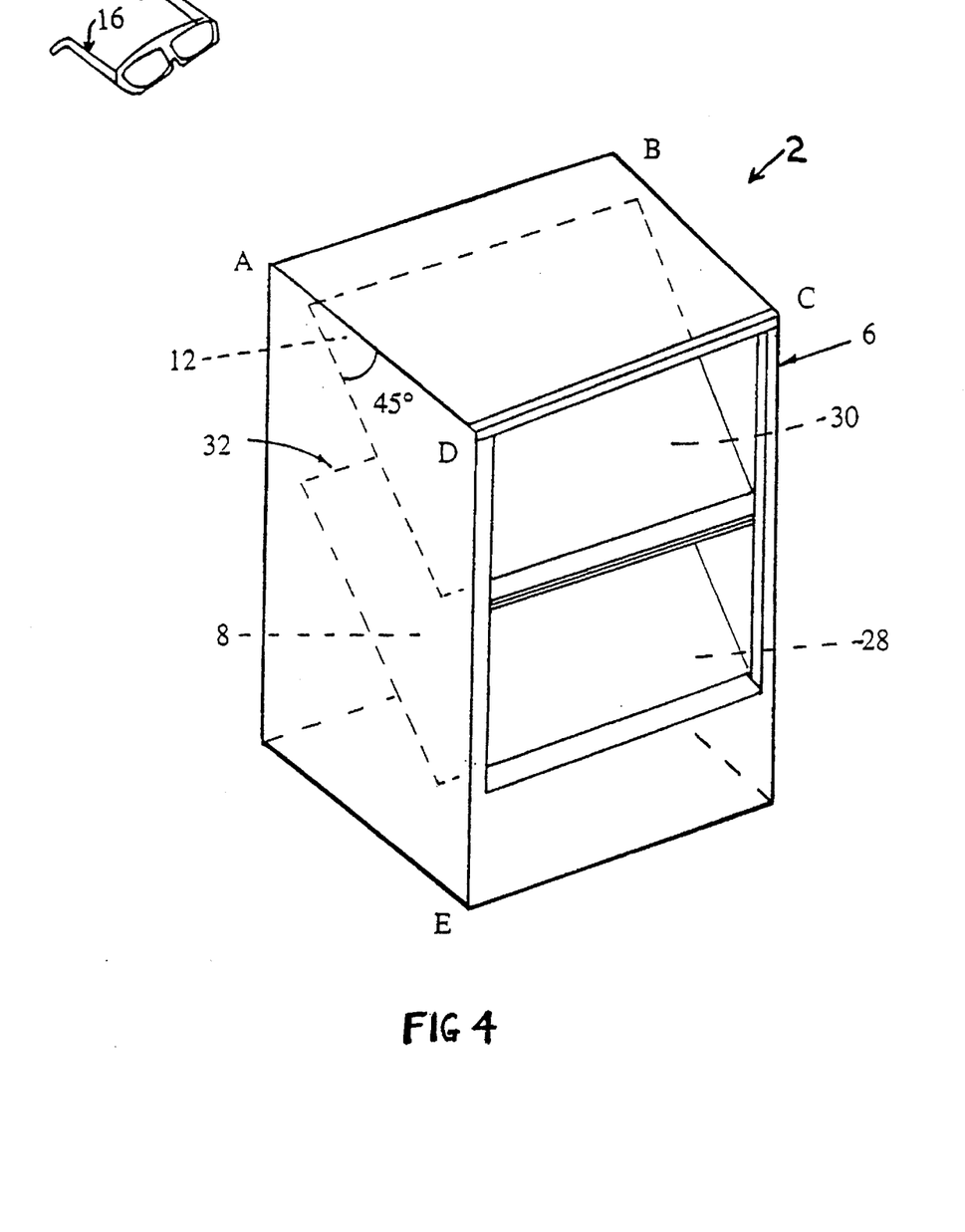
FIG. 4 is an enlarged view of part of the apparatus shown in FIG. 3 and is viewed from the same angle as FIG. 2.

Referring now to FIGS. 3 and 4, there is shown second apparatus 2 for stereoscopically viewing a television screen. The apparatus 2 shown in FIGS. 3 and 4 is similar to the apparatus 2 shown in FIGS. 1 and 2 and similar parts have been given the same reference numerals for ease of comparison and understanding.

As compared with the apparatus 2 shown in FIGS. 1 and 2, the apparatus 2 shown in FIGS. 3 and 4 is of a simpler construction in that the mirror 10 and its part of the housing 6 is omitted. The right eye image is viewed directly through the mirror 12 and polarizing frame 14.

Figure 5:
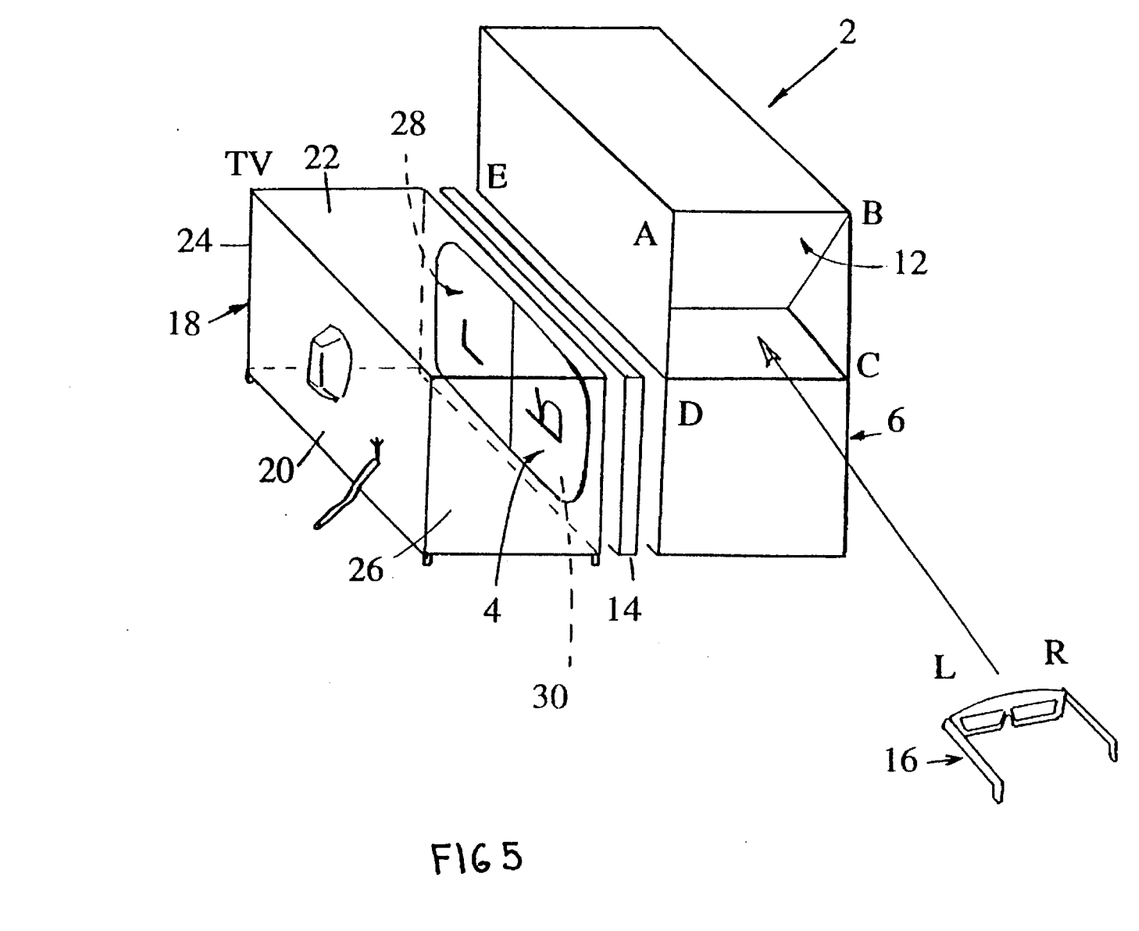
FIG. 5 shows third apparatus for stereoscopically viewing television pictures.
Figure 6:
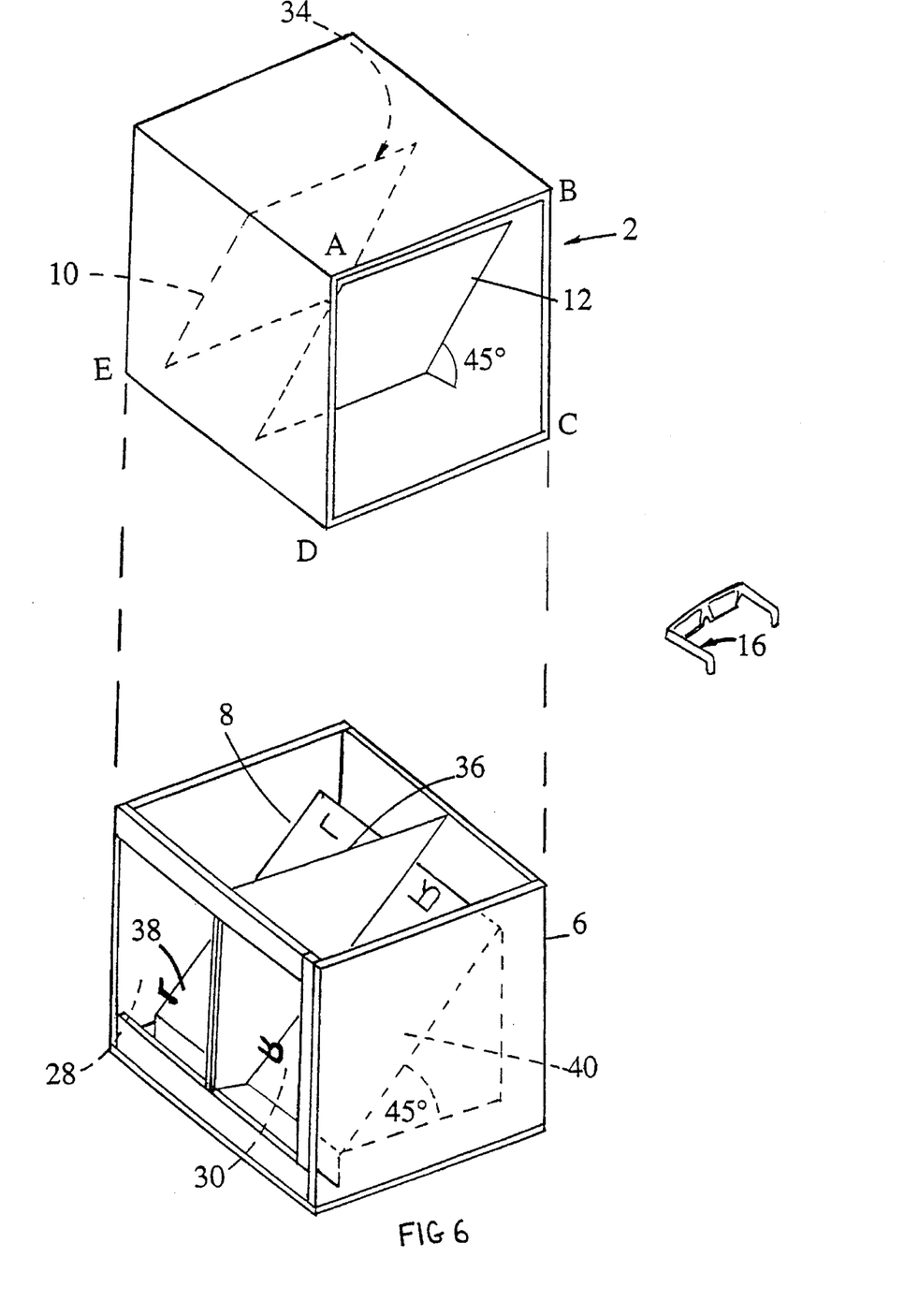
FIG. 6 shows part of the apparatus shown in FIG. 5 and viewed from the same angle.

Referring now to FIGS. 5 and 6, there is shown third apparatus 2 for stereoscopically viewing a television screen. Again, similar parts as in FIGS. 1 and 2 have been given the same reference numerals for ease of comparison and understanding. Also, in FIG. 6, the housing 6 has been separated in a similar manner to that shown in FIG. 2 in order to facilitate understanding.

It will be seen from FIG. 5 that the television 18 is positioned on its base 20 but it is rotated 90° anti-clockwise as seen from above and with respect to the polarizing spectacles 16.

As can best be seen from FIG. 6, the mirror 12 is positioned above the lower mirror 8. The mirror 10 is positioned between the lower mirror 8 and the mirror 12, with the mirror 10 being horizontally in line with the mirror 12. The mirror 10 is hinged about its upper edge 34.

As can be seen from a combination of FIGS. 5 and 6, the television screen 4 is positioned adjacent the lower mirror 8. An optical barrier means in the form of an opaque divider 36 separates the lower mirror. 8 into a first part 38 and a second part 40. The first polarizing filter 28 is positioned between the television screen 4 and the first part 38. The second and oppositely polarizing filter 30 is positioned between the television screen 4 and the second part 40.

The apparatus 2 shown in FIGS. 1 and 2, 3 and 4, and 5 and 6 will usually be mounted as close as possible to the television screen 4. The apparatus 2 as shown in FIGS. 1 and 2, when compared with the apparatus 2 shown in FIGS. 5 and 6, gives a wider angle of viewing, may be of a reduced size, gives the facility of viewing left and right eye images separately whilst upright, and may provide easier vertical alignment of images when setting up the apparatus 2.

As can be seen from a comparison of FIGS. 1, 2, and 5, 6 the letters A,B,C,D,E show that the bottom half of the apparatus 2 shown in FIGS. 1 and 2 is essentially the same as the top half of the apparatus 2 shown in FIGS. 5 and 6.

Figure 7:
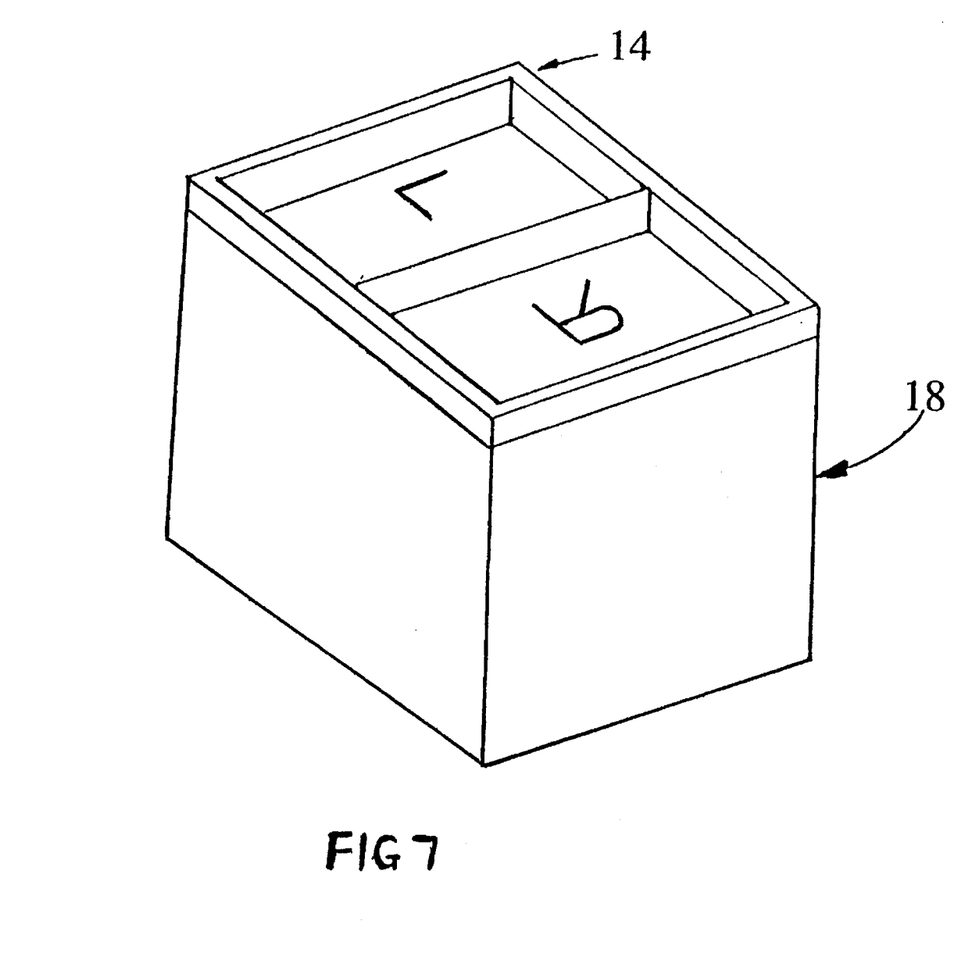
FIG. 7 shows pare of fourth apparatus for stereoscopically viewing television pictures.

FIG. 7 illustrates how the television 18 shown in FIG. 5 and the bottom part of the housing 6 shown in FIG. 6 can be combined into a purpose built unit. The entire apparatus 2 can then be considerably reduced in bulk with laterally inverted images being displayed directly to the upper half of the housing 60 shown in FIG. 6. Thus FIG. 6 utilises optical means for laterally inverting images, and FIG. 7 utilises electronic means for laterally inverting images.

Figure 8:
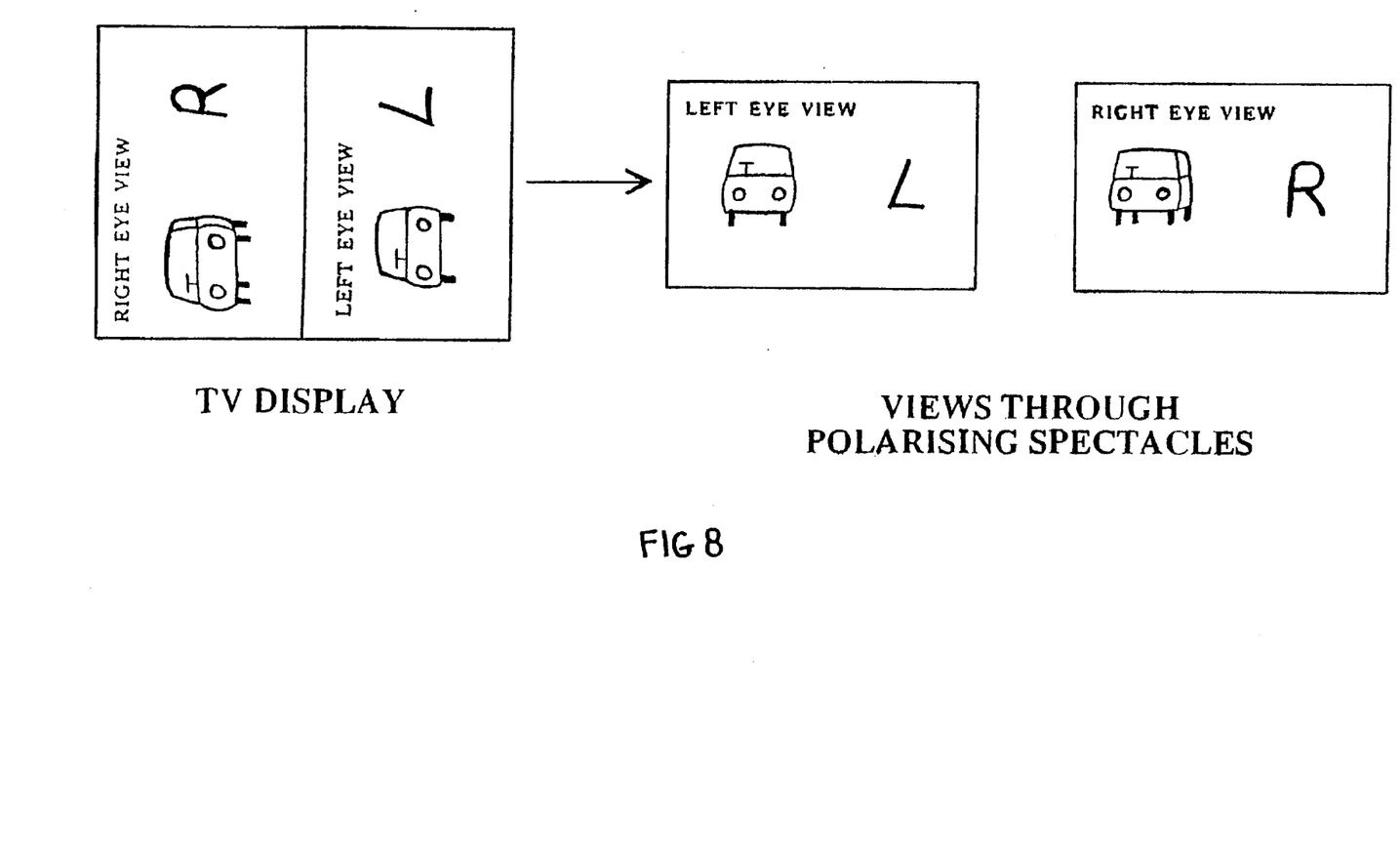
FIG. 8 illustrates how the stereoscopic viewing is obtained.
Figure 9:
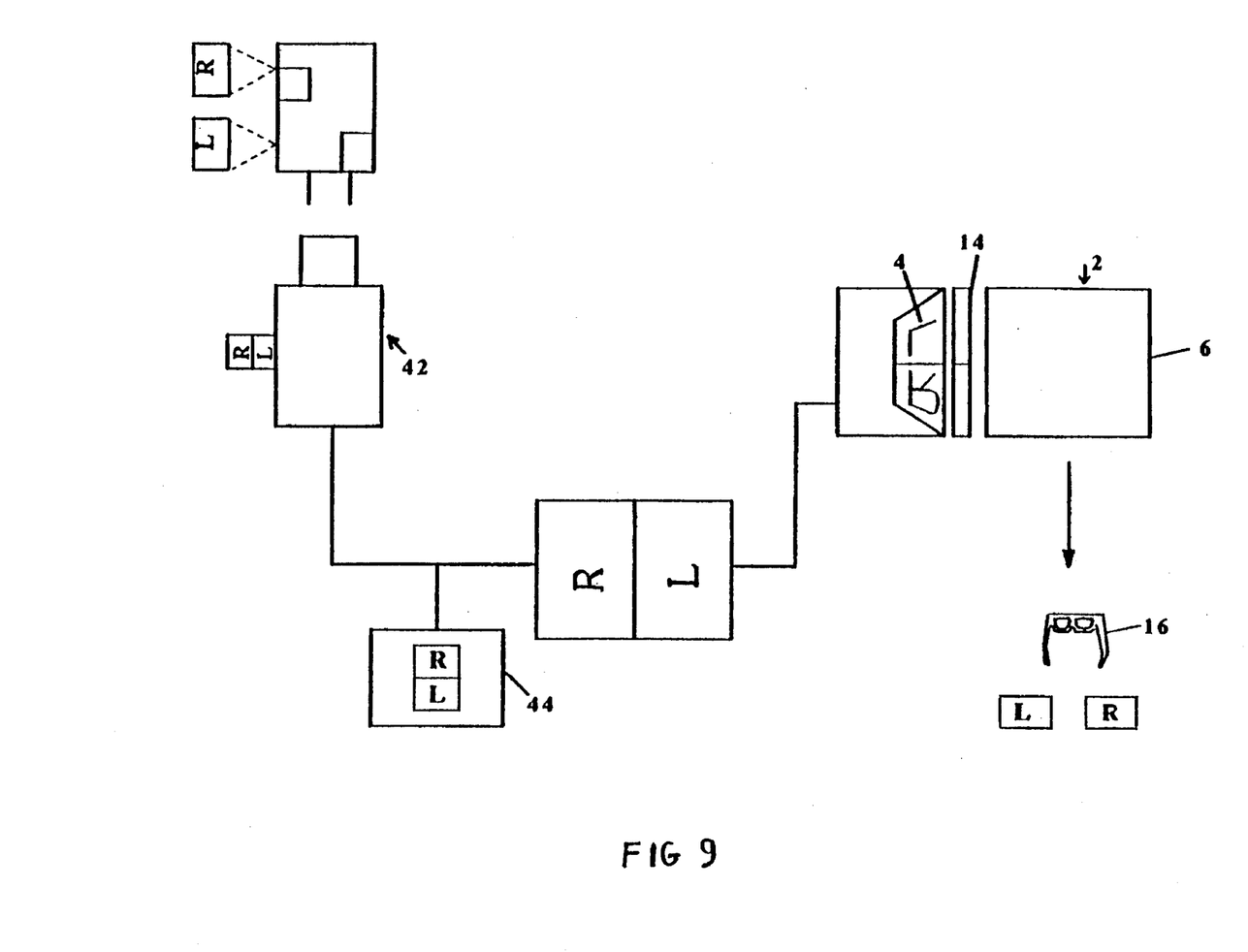
FIG. 9 illustrates apparatus combined to give three dimensional viewing from integrated stereoscopic recording, image generation and viewing systems.

FIG. 8 shows in a self-explanatory manner views obtained through the polarizing spectacles FIG. 9 illustrates apparatus combined to give three dimensional viewing from integrated stereoscopic recording apparatus 42 and/or image generation and viewing apparatus 44. The apparatus 44 may be computers, projectors or other suitable and appropriate apparatus. The method of obtaining a stereoscopic pair of polarized landscape format images on a screen is described in my U.S. Pat. No. 5,270,751. The disclosure in this patent is included in the present specification insofar as the apparatus of the present invention may be used with the apparatus described in my U.S. Pat. No. 2,236,198.

It is to be appreciated that the embodiments of the invention described above with reference to the accompanying drawings have been given by way of example only and that modifications may be effected. Thus, for example, instead of having the polarizing filters 28, 30 mounted in the polarizing frame 14, the polarizing filters 28, 30 could be mounted directly on the television screen 4. Another type of beam splitter mirror 12 may be employed and the mirrors 8, 10, 12 may be replaced by other optical arrangements, including lenses and prisms if desired. Instead of viewing pictures on television screens, the pictures may be viewed on other types of screens including for example computer screens, projection screens and liquid crystal display screens.

I claim:

1. Apparatus for stereoscopically viewing images from a single screen, which apparatus comprises a housing, at least one mirror which just reflects light, a mirror which both reflects and transmits light, and polarizing means, the said mirrors being mounted at an angle and being optically in communication with each other whereby a pair of landscape stereoscopic images are optically manipulated between an orientation required for human viewing and an alternative orientation suitable for visual image recording or reproduction, the alternative orientation being such that there is no vertical inversion or lateral inversion of one of the landscape stereoscopic images with respect to the other of the landscape stereoscopic images, and the alternative orientation also being such that the landscape stereoscopic images are each rotated about their geometric centers relative to a human viewing eye line and located for display in each of two halves of the screen, such that their longest sides are parallel with shortest edges of the screen, thereby maintaining a good aspect ratio without the need for compression or stretching of the two landscape stereoscopic images.

2. Apparatus according to claim 1 in which the mirror which both reflects and transmits light is a half silvered mirror which reflects substantially 50 percent of the light and which transmits substantially 50 percent of the light.

3. Apparatus according to claim 1 in which the polarizing means includes polarizing filters and/or polarizing spectacles.

4. Apparatus according to claim 1 and which includes a television having a base, a top and sides, and in which the television is positioned on one of its sides, in which the mirror which both reflects and transmits light is positioned between upper and lower mirrors which just reflect light, in which a television screen of the television is positioned adjacent the lower mirror and the mirror which both reflects and transmits light, in which a first polarizing filter is positioned between the television screen and the lower mirror, and in which a second and oppositely polarizing filter is positioned between the television screen and the mirror which both reflects and transmits light.

5. Apparatus according to claim 4 in which the lower mirror is a hinged mirror which is hinged about an upper edge.

6. Apparatus according to claim 1 and which includes a television having a base, a top and sides, and in which the television is positioned on its base, in which the mirror which both reflects and transmits light is positioned above a lower mirror which just reflects light and is also positioned between the lower mirror which just reflects light and another mirror which just reflects light and which is horizontally in line with the mirror which both reflects and transmits light, in which a television screen of the television is positioned adjacent the lower mirror, in which optical barrier means separates the lower mirror into first and second parts, in which a first polarizing filter is positioned between the television screen and the first part of the lower mirror, and in which a second and oppositely polarizing filter is positioned between the television screen and the second part of the lower mirror.

7. Apparatus according to claim 6 in which the said another mirror is hinged about an upper edge, in order to provide vertical alignment of the two images for a given size of television screen and viewing position.

* * * * *